(12) United States Patent
Jensen (10) Patent No.: US 9,110,540 B2
(45) Date of Patent: Aug. 18, 2015

(54) TOUCH-SENSITIVE DEVICE AND METHOD FOR DETECTION OF TOUCH

(75) Inventor: Jørgen Korsgaard Jensen, London (GB)

(73) Assignee: O-Net Wavetouch Limited, Hong Kong (CN)

( * ) Notice: Subject to any disclaimer, the term of this patent is extended or adjusted under 35 U.S.C. 154(b) by 170 days.

(21) Appl. No.: 13/639,950

(22) PCT Filed: Apr. 7, 2011

(86) PCT No.: PCT/EP2011/055436
§ 371 (c)(1),
(2), (4) Date: Mar. 6, 2013

(87) PCT Pub. No.: WO2011/124648
PCT Pub. Date: Oct. 13, 2011

(65) Prior Publication Data
US 2013/0162555 A1    Jun. 27, 2013

(30) Foreign Application Priority Data
Apr. 7, 2010  (DK) ................................. 2010 00292

(51) Int. Cl.
*G06F 3/041* (2006.01)
*G06F 3/042* (2006.01)
*G01J 1/04* (2006.01)
*G01J 1/42* (2006.01)

(52) U.S. Cl.
CPC ............... *G06F 3/042* (2013.01); *G01J 1/0407* (2013.01); *G01J 1/0425* (2013.01); *G01J 1/42* (2013.01); *G06F 3/0428* (2013.01); *G06F 2203/04808* (2013.01)

(58) Field of Classification Search
CPC .................. G06F 3/042; G06F 3/0428; G06F 2203/04808; G01J 1/42; G01J 1/0407; G01J 1/0425
USPC .................. 345/156–184; 250/206.1, 227.14, 250/492.1; 715/764, 773, 858
See application file for complete search history.

(56) References Cited

U.S. PATENT DOCUMENTS

| | | | |
|---|---|---|---|
| 6,522,794 B1 * | 2/2003 | Bischel et al. | 385/4 |
| 8,274,496 B2 * | 9/2012 | Ung et al. | 345/176 |
| 2005/0200293 A1 * | 9/2005 | Naugler et al. | 315/149 |
| 2006/0088244 A1 * | 4/2006 | Kukulj et al. | 385/33 |
| 2006/0227120 A1 * | 10/2006 | Eikman | 345/175 |
| 2008/0048979 A1 * | 2/2008 | Ruttenberg | 345/158 |
| 2008/0060854 A1 * | 3/2008 | Perlin | 178/18.03 |
| 2008/0106523 A1 * | 5/2008 | Conrad | 345/173 |
| 2008/0123908 A1 * | 5/2008 | Waldman et al. | 382/124 |

(Continued)

FOREIGN PATENT DOCUMENTS

WO    2008/017077 A2    2/2008
WO    2008/148307 A1    12/2008

*Primary Examiner* — Prabodh M Dharia
(74) *Attorney, Agent, or Firm* — Hamilton, Brook, Smith & Reynolds, P.C.

(57) ABSTRACT

The present invention relates to a method and a device for detection of position of touch. The device comprises a waveguide, at least one light source, and at least one detector device. The waveguide has a touch-surface with a surface structure defining a pattern that defines active surface areas and passive surface areas. The pattern is distributed such that an object that contacts a first area will cause a different disturbance of light than an object that contacts a second area, and such that correct positions of a plurality of concurrent touches may be detected.

11 Claims, 8 Drawing Sheets

(56) References Cited

U.S. PATENT DOCUMENTS

| | | |
|---|---|---|
| 2008/0150848 A1 | 6/2008 | Chung |
| 2008/0150905 A1* | 6/2008 | Grivna et al. ................ 345/173 |
| 2008/0157005 A1* | 7/2008 | Lundquist et al. ......... 250/492.1 |
| 2008/0231611 A1* | 9/2008 | Bathiche et al. ............. 345/175 |
| 2009/0056098 A1* | 3/2009 | Payne ............................ 29/428 |
| 2009/0146973 A1* | 6/2009 | Ung et al. .................... 345/176 |
| 2009/0237366 A1 | 9/2009 | Yeh et al. |
| 2010/0127995 A1* | 5/2010 | Rigazio et al. ............... 345/173 |
| 2010/0231522 A1* | 9/2010 | Li ................................. 345/169 |
| 2010/0302185 A1* | 12/2010 | Han et al. ..................... 345/173 |
| 2010/0302210 A1* | 12/2010 | Han et al. ..................... 345/175 |
| 2011/0007035 A1* | 1/2011 | Shai ............................. 345/179 |
| 2011/0291988 A1* | 12/2011 | Bamji et al. .................. 345/175 |
| 2012/0182266 A1* | 7/2012 | Han ............................. 345/175 |
| 2012/0218229 A1* | 8/2012 | Drumm ........................ 345/175 |
| 2012/0229425 A1* | 9/2012 | Barrus et al. ................. 345/179 |
| 2013/0046397 A1* | 2/2013 | Fadell et al. ................... 700/83 |
| 2013/0120316 A1* | 5/2013 | Ung et al. .................... 345/175 |
| 2014/0354601 A1* | 12/2014 | Bita et al. ..................... 345/175 |

* cited by examiner

TOUCH-SENSITIVE DEVICE AND METHOD FOR DETECTION OF TOUCH

The present invention relates to a method and a device for detecting touch, e.g. by a finger touching a touch-surface of the device. In particular the invention relates to detection of touch by means of influencing, by means of the touch, propagation of light within the device and detecting resulting change of light arriving to at least one detector device of the device.

WO 2009/086836 discloses a device for detecting position of an object touching the device. The position of the object touching the device is detected by means of the object disturbing light guided by the device from a light source towards a detector and detecting the resulting change of light arriving to the detector. A position of touch may be determined on the basis of determination of two coordinates of a two-dimensional surface of touch.

Figure 1:
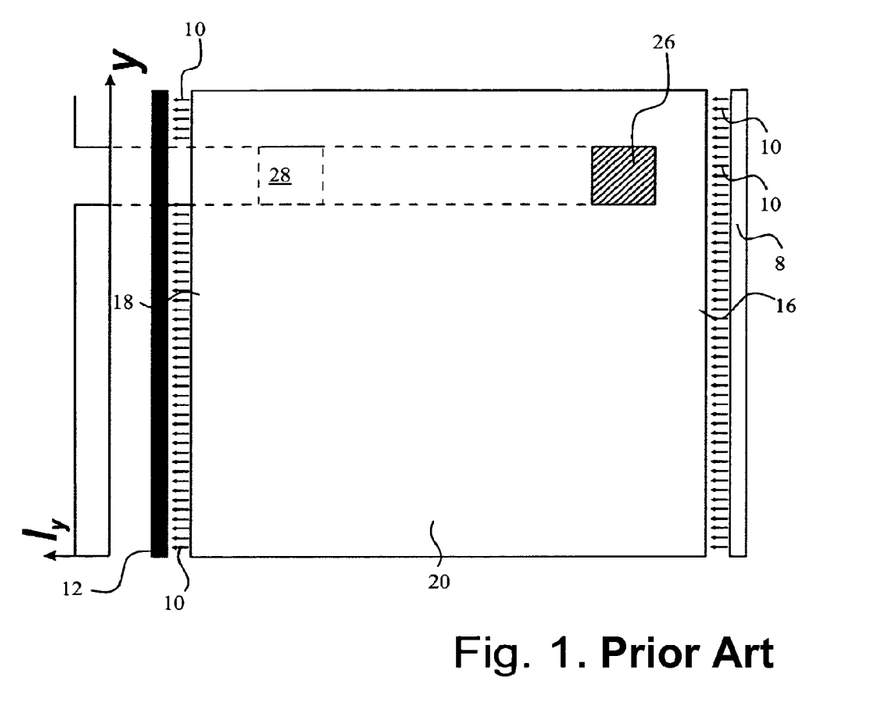
FIG. 1 schematically illustrates a problem of the prior art.

The inventor of the present invention has realized a problem of the prior art. The problem is illustrated by means of FIG. 1. FIG. 1 illustrates a waveguide 20 adapted for guiding light 10 from a source 8 towards a detector device 12. If an object disturbs light 10 at the area 26, only a y-coordinate of the touch can be detected by the detector device 12. This is furthermore illustrated by the graph showing intensity ($I_y$) as a function of the y-coordinate. Furthermore, if another touch, e.g. at the area 28, is present simultaneously, only one coordinate will be detectable, and thus only one touch will be detectable.

Accordingly, there is a need for an improved detection of position of an object. Thus, it is an object of the present invention to provide an improved detection of position of an object.

According to a first aspect of the present invention, a device comprising a waveguide is provided. Preferably, the device furthermore comprises at least one light source for emitting first light, and at least one detector device for detecting first light. The waveguide is adapted to guide first light across at least a first part of the waveguide from a first end of the first part towards a second end of the first part. The waveguide has a touch-surface. The touch-surface enables an object to disturb first light propagating within the waveguide device by touching the touch-surface. The touch-surface has a surface structure defining a pattern that defines active surface areas and passive surface areas. An active surface area enables an object to disturb first light propagating at the active area. A passive surface area inhibits an object to disturb or allows less disturbance of first light propagating at the passive area. Preferably, the pattern is distributed such that for a first area of the touch-surface and a second area of the touch-surface, which second area has an outline that is at least substantially identical with the outline of the first area, and which second area is preferably only displaced along the intended direction of the first light from the first end of the first part of the waveguide to the second end of the first part of the waveguide, an object that only contacts the entire first area will cause a different disturbance of first light than an object that only contacts the entire second area when first light is guided by the waveguide from the first end of the first part of the waveguide towards the second end of the first part of the waveguide, i.e. during the intended use of the device.

An advantage of the present invention is that an object touching the touch-surface may disturb and encode light that only propagates in one direction, which light may be decoded into the two-dimensional position of touch.

A further advantage of the present invention is that a concurrent plurality of touches, such as two concurrent touches, may disturb and encode light that may be decoded into the plurality of two-dimensional positions of touch. This may also be possible by disturbance of light that only propagates in one direction.

According to a second aspect of the present invention, a method for detecting at least one position of touch on a touch-surface of a device according to the present invention is provided. The method comprises generating first light by means of at least one light source. The method comprises guiding first light within the waveguide from the first end towards the second end. The method comprises detecting, by means of at least one detector device, light intensities of first light having propagated within the waveguide.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

The figures are schematic and simplified for clarity, and they may merely show details which are essential to the understanding of the invention, while other details may have been left out. Throughout, the same reference numerals are used for identical or corresponding parts.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and sufficient, and will fully convey the concept of the invention to those skilled in the art.

DETAILED DESCRIPTION

The waveguide and/or the light source and/or the detector device may comprise one or more of the features disclosed in WO 2009/086836 and/or in European patent application EP 10150036.1. For generating first light, and possibly second light, redirecting structures and/or redirecting elements as disclosed in WO 2009/086836 and/or in European patent application EP 10150036.1 may be used.

The waveguide may have any shape, such as at least substantially rectangular or elliptic. An at least substantially rectangular waveguide may for instance be between 2 and 40 cm in width and between 2 and 40 cm in length.

The waveguide according to the present invention may be adapted to guide second light across at least the first part of the waveguide from a third end of the first part towards a fourth end of the first part. The pattern may be distributed such that for a third area of the touch-surface, which third area has an outline that is identical with the outline of the first area, and which third area is displaced along the intended direction of the second light from the third end to the fourth end, an object that only contacts the entire first area will cause a different disturbance of second light than an object that only contacts the entire third area when second light is guided by the waveguide from the third end towards the fourth end. Thus, a concurrent plurality of touches, such as two concurrent touches, may disturb and encode light in an improved way, such that the encoded light may be decoded into an improved detection of the plurality of positions of touch.

Second light may intersect first light, e.g. at substantially right angles.

Provision of a device according to the present invention that utilizes second light may provide an improved position resolution along an axis parallel with the first light.

Preferably, the first light comprises parallel rays of light that illuminates at least a substantial part of the touch-surface, such as substantially all the touch-surface.

Preferably, the second light comprises parallel rays of light that illuminates at least a substantial part of the touch-surface, such as substantially all the touch-surface.

Active surface areas and passive surface areas are preferably adapted to enable and restrain, respectively, disturbance of light by means of an object touching the touch-surface.

The waveguide may be a planar waveguide. Alternatively, the waveguide may comprise a plurality of one-dimensional waveguides, each of which may stretch between the first end of the first part of the waveguide and the second end of the first part of the waveguide.

The passive surface areas may be provided by coating. The coating may have a lower refractive index than the waveguide, i.e. the core of the waveguide.

The coating may have a thickness of around 30 to 300 nm, such as around 200 nm. The coating may be applied in a number of lines or a grid having a width of e.g. around 0.1 to 1 mm, such as around 0.5 mm. Between adjacent lines, e.g. in a grid, may be a distance of around e.g. 1 to 5 mm, such as around 2 to 3 mm. Alternatively, the coating may be wide and the active area in between the coating may be thin in relation to the passive areas. This may improve the ability to detect and deduce positions of a plurality of touches.

The coating may comprise magnesium fluoride or fluoropolymer such as PTFE. The coating may for instance be applied by means of deposition, such as vapour deposition.

The passive surface areas may be provided by recesses in the touch-surface, e.g. by a plurality of recesses for each passive surface area. The plurality of recesses may prevent or diminish disturbance of light by touching the touch-surface.

The pattern may define a plurality of zones. Passive surface area parts within each zone may be formed by displacement of passive surface area parts within an adjacent zone. The displacement may be along two perpendicular directions in relation to the adjacent zone.

The device according to the present invention may comprise a processor adapted for position encoding a position of an object touching the touch-surface based on light intensities received by the at least one detector device. The processor may be adapted for position encoding two concurrent positions of objects touching the touch-surface based on light intensities received by the at least one detector device.

The device according to the present invention may be part of a touch screen. The touch screen may for instance be incorporated in an optical table or a handheld device. The handheld device may comprise at least one of a mobile phone, a pda, and a portable music player.

The method according to the present invention may be for detecting at least one position of touch on a touch-surface of a device according to the present invention.

Figure 7:
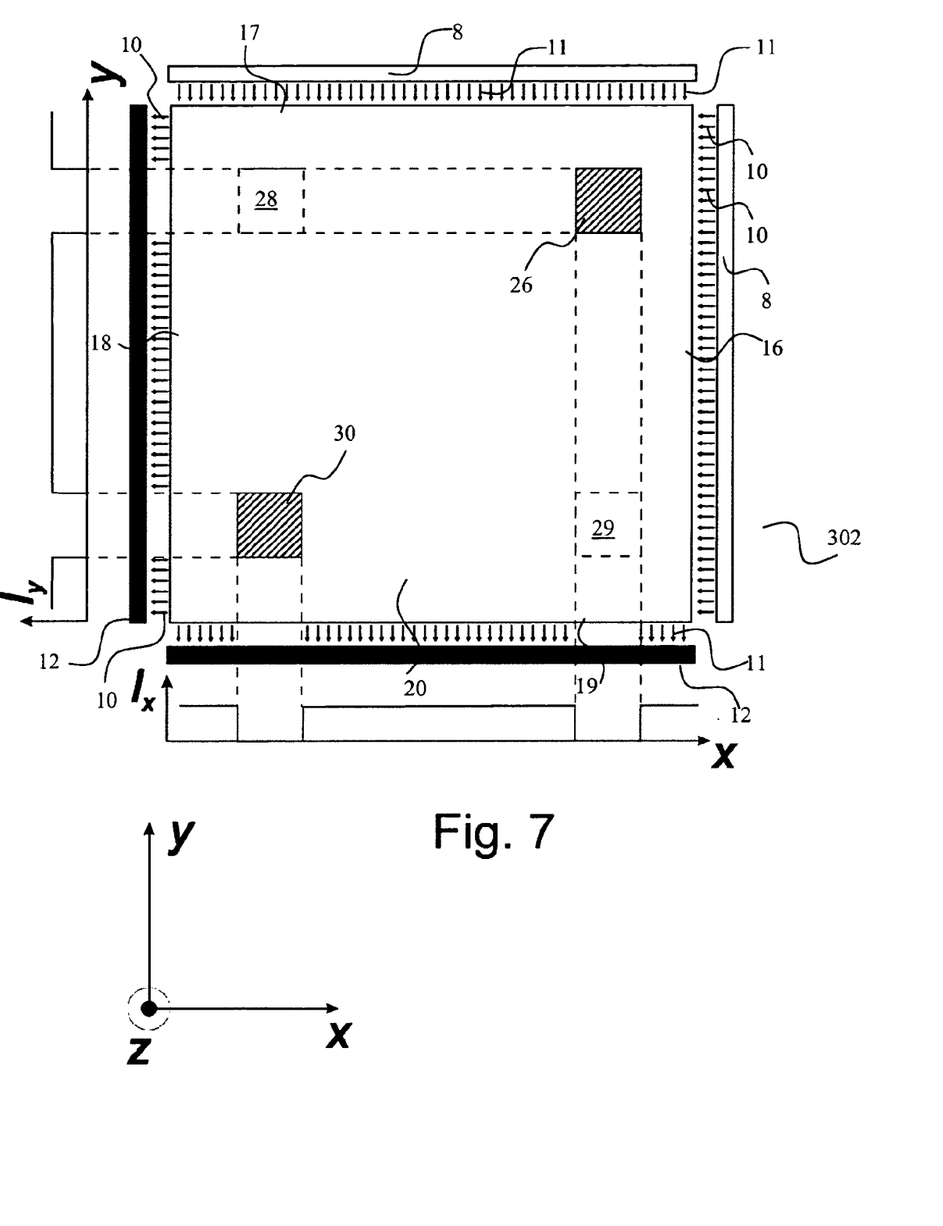

The inventor of the present invention has realized a further problem of the prior art. The further problem is illustrated by means of FIG. 7. FIG. 7 illustrates a waveguide 20 adapted for guiding light 10 and 11 from at least one source 8 towards at least one detector device 12. If an object disturbs light 10 and 11 at the area 26 and another object disturbs light 10 and 11 at the area 30 simultaneously, two y- and two x-coordinates can be deduced. This is furthermore illustrated by the graph showing intensity ($I_y$) as a function of the y-coordinate and the graph showing the intensity ($I_x$) as a function of the x-axis. However, it may be a problem to deduce whether the coordinates relates to the areas 26 and 30 or to the areas 28 and 29. This problem is solved by the present invention.

Figure 2:
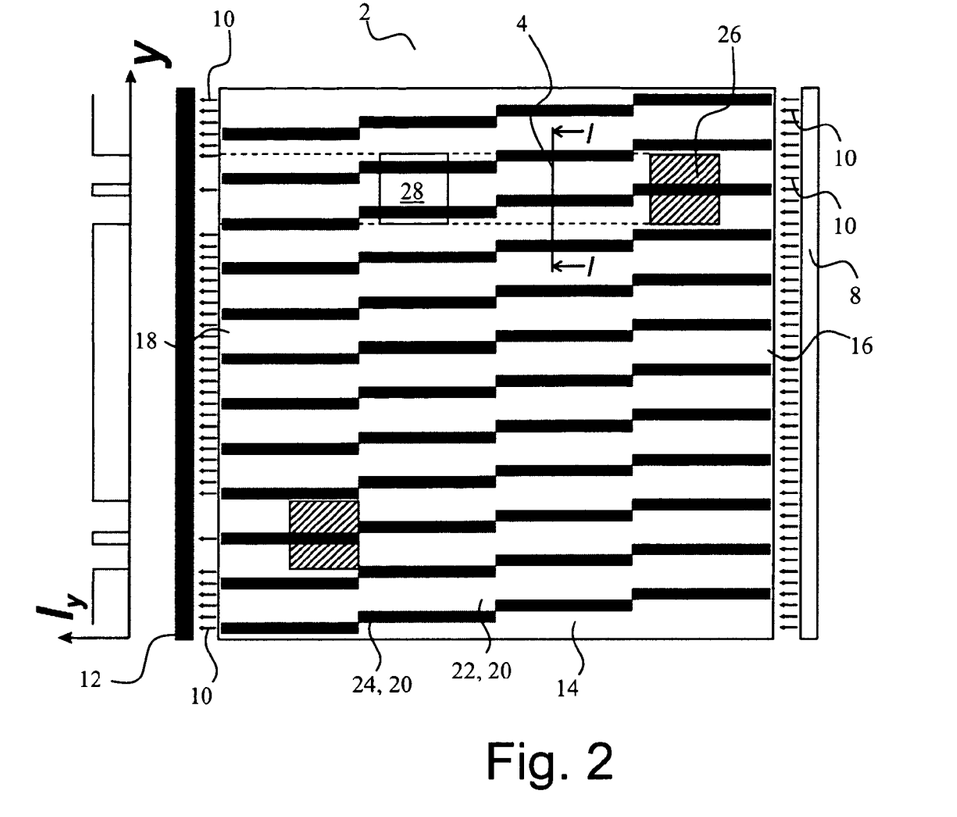
FIG. 2 schematically illustrates a top view of a first embodiment of the invention, FIG. 3 schematically illustrates a cross-section of the first embodiment along the line I-I indicated in FIG. 2, FIG. 4 schematically illustrates a cross-section of an embodiment of the invention with an alternative surface structure, FIG. 5 schematically illustrates a cross-section of an embodiment of the invention with an alternative waveguide, FIG. 6 schematically illustrates a top view of a second embodiment of the invention, FIG. 7 schematically illustrates another problem of the prior art, FIG. 8 schematically illustrates a top view of a third embodiment of the invention, FIG. 9 schematically illustrates a top view of a fourth embodiment of the invention, FIG. 10 schematically illustrates a device according to the present invention comprising a processor, FIG. 11 schematically illustrates a device according to present invention being part of a touch screen, and FIG. 12 schematically illustrates a method for detecting at least one position of touch at a touch-surface on a device according to the present invention.
Figure 3:
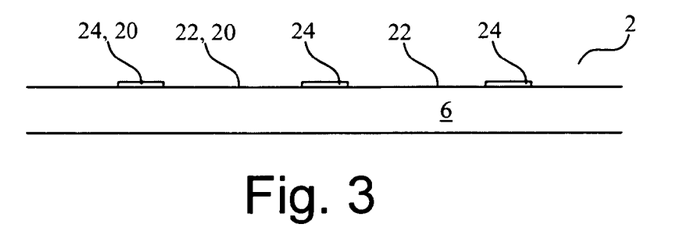

FIG. 2 schematically illustrates a top view of a first embodiment 2 of a device according to the present invention. FIG. 3 schematically illustrates a cross-section of the first embodiment 2 along the line I-I indicated in FIG. 2. The device 2 illustrated in FIGS. 1 and 2 comprises a waveguide 6 (a planar waveguide), at least one light source 8 for emitting first light 10, and at least one detector device 12 for detecting first light 10. The waveguide 6 is adapted to guide first light 10 across at least a first part 14 of the waveguide 6 from a first end 16 of the first part 14 towards a second end 18 of the first part 14. The waveguide 6 has a touch-surface 20 with a surface structure defining a pattern that defines active surface areas 22 and passive surface areas 24. The pattern is distributed such that for a first area 26 of the touch-surface 20 and a second area 28 of the touch-surface 20, which second area 28 has an outline that is identical with the outline of the first area, and which second area 28 is displaced along the direction of the first light 10 from the first end 16 to the second end 18, an object (not illustrated) that only contacts the entire first area 26 will cause a different disturbance of first light 10 than an object that only contacts the entire second area 28 when first light 10 is guided by the waveguide 6 from the first 16 end towards the second end 18. The passive surface areas 24 are provided by coating having a lower refractive index than the waveguide 6.

When an object touch the touch-surface, e.g. at the area 26, light propagating within waveguide at the active surface area part(s) of the area 26 may be disturbed as disclosed in International patent application WO/2009/086836 and/or the European patent application EP 10150036.1. However, the light propagating within waveguide at the passive surface area part(s) of the area 26 may not be disturbed or is at least disturbed less. Thus, the object may encode a two-dimensional position into light propagating in one direction. With regard to FIG. 2, the intensity distribution that is effected by the touch 26 cannot relate to e.g. the area 28.

Note that for the embodiment of FIG. 2 and any subsequent embodiment, the light source and the detector device are schematically illustrated as elements situated along sides of the waveguide. This is merely done for illustrative purposes. The at least one light source and/or detector device may be situated any other place, for instance at one or more corners of the waveguide as disclosed in the International patent application WO/2009/086836 and/or the European patent application EP 10150036.1. The first light 10 (and/or the second light explained below) may be generated by redirecting light from the at least one light source, by means of redirecting members or redirecting elements, along paths from the at least one light source towards the detector device/array as disclosed in the International patent application WO/2009/086836 and/or the European patent application EP 10150036.1. Thus, the first light 10 (and maybe the second light) may be provided.

In each of FIGS. 1, 2, and 6-9, a graph that shows intensity (I$_y$) as a function of the y-coordinate when arriving at the end 18 is included. Furthermore, in each of FIGS. 7-9 a graph that shows the intensity (I$_x$) as a function of the x-coordinate when arriving at the end 20 is included. Each intensity distribution may be regarded as a signature showing number of touch-coordinates and their positions.

The pattern illustrated in FIG. 2 defines a plurality of zones. For instance, the pattern of FIG. 2 comprises four zones, each covering a rectangle defined by a quarter of the touch-surface along the x-axis and the entire length of the touch-surface along the y-axis. Passive surface area parts 24 within each zone are formed by displacement of passive surface area parts 24 within an adjacent zone, the displacement being along two perpendicular directions, i.e. along the x-axis and y-axis in relation to the adjacent zone. A displacement of a touch-area from one zone to another may provide an x-coordinate.

Figure 4:
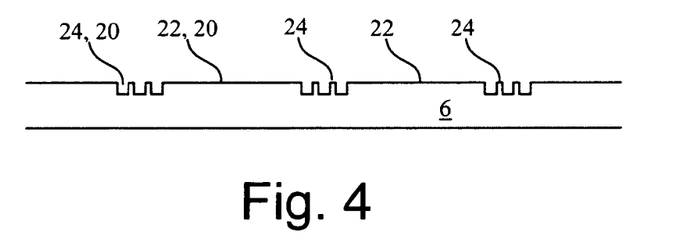

FIG. 4 schematically illustrates a cross-section of an embodiment of the invention, wherein the passive surface areas 24 are provided by recesses in the touch-surface 20.

Figure 5:
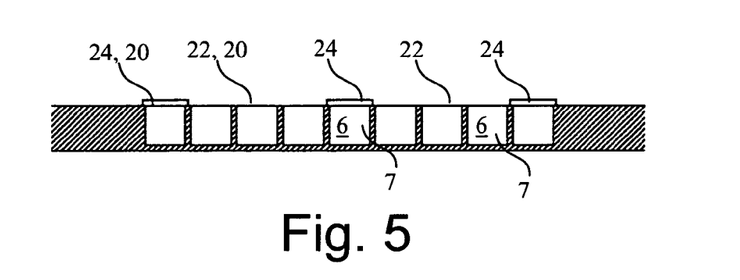

FIG. 5 schematically illustrates a cross-section of an embodiment of the invention, wherein the waveguide 6 comprises a plurality of one-dimensional waveguides 7. Each one-dimensional waveguide 7 stretches between the first end and the second end.

Figure 6:
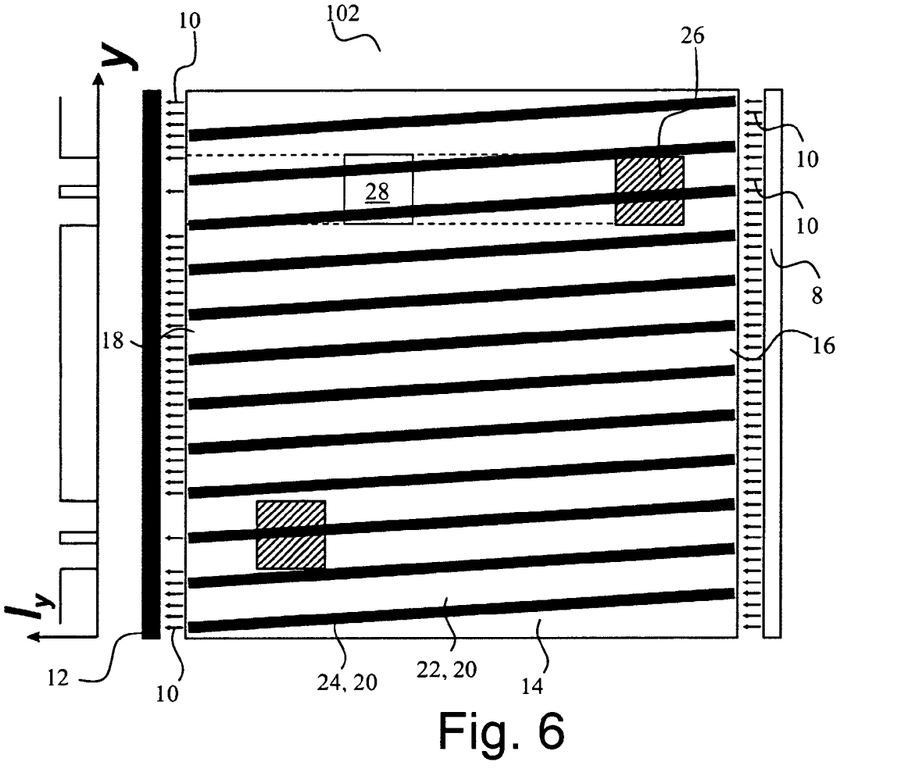

FIG. 6 schematically illustrates a top view of a second embodiment 102 of the invention. The device 102 illustrated in FIG. 6 comprises a waveguide 6 (a planar waveguide), at least one light source 8 for emitting first light 10, and at least one detector device 12 for detecting first light 10. The waveguide 6 is adapted to guide first light 10 across at least a first part 14 of the waveguide 6 from a first end 16 of the first part 14 towards a second end 18 of the first part 14. The waveguide 6 has a touch-surface 20 with a surface structure defining a pattern that defines active surface areas 22 and passive surface areas 24. The pattern is distributed such that for a first area 26 of the touch-surface 20 and a second area 28 of the touch-surface 20, which second area 28 has an outline that is identical with the outline of the first area, and which second area 28 is displaced along the direction of the first light 10 from the first end 16 to the second end 18, an object (not illustrated) that only contacts the entire first area 26 will cause a different disturbance of first light 10 than an object that only contacts the entire second area 28 when first light 10 is guided by the waveguide 6 from the first 16 end towards the second end 18. The passive surface areas 24 are provided by coating having a lower refractive index than the waveguide 6. If a touch area, e.g. 26, is significant large in relation to the width of active surface areas 22 and passive surface areas 24, a unique disturbance of first 10 light may occur for any touch-position on the touch-surface 20.

Figure 8:
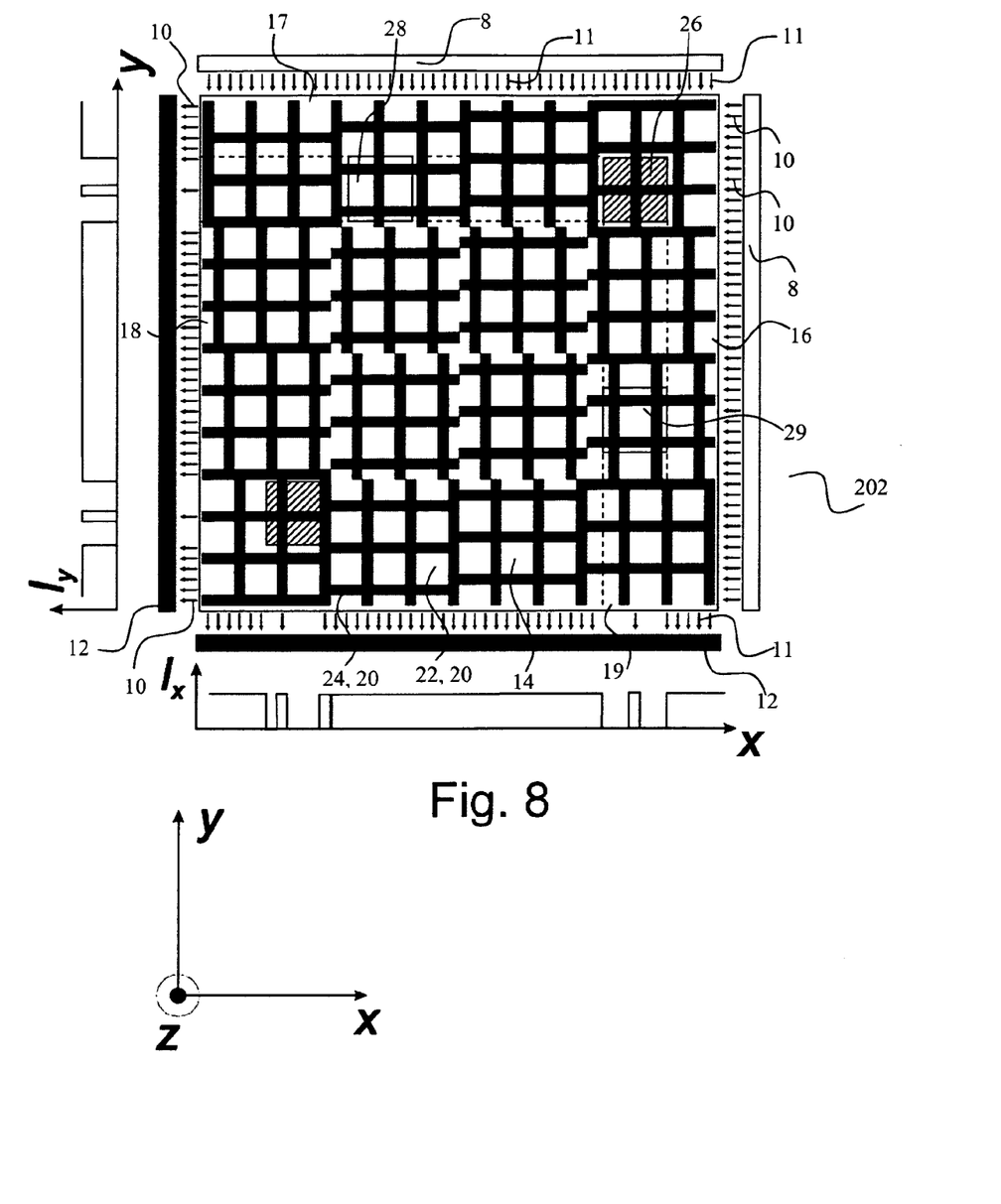

FIG. 8 schematically illustrates a top view of a third embodiment 202 of the invention. The device 202 illustrated in FIG. 8 comprises a waveguide 6 (a planar waveguide), at least one light source 8 for emitting first light 10, and at least one detector device 12 for detecting first light 10. The waveguide 6 is adapted to guide first light 10 across at least a first part 14 of the waveguide 6 from a first end 16 of the first part 14 towards a second end 18 of the first part 14. The waveguide 6 has a touch-surface 20 with a surface structure defining a pattern that defines active surface areas 22 and passive surface areas 24. The pattern is distributed such that for a first area 26 of the touch-surface 20 and a second area 28 of the touch-surface 20, which second area 28 has an outline that is identical with the outline of the first area, and which second area 28 is displaced along the direction of the first light 10 from the first end 16 to the second end 18, an object (not illustrated) that only contacts the entire first area 26 will cause a different disturbance of first light 10 than an object that only contacts the entire second area 28 when first light 10 is guided by the waveguide 6 from the first 16 end towards the second end 18. The passive surface areas 24 are provided by coating having a lower refractive index than the waveguide 6. The waveguide 6 is further adapted to guide second light 11 across at least the first part 14 of the waveguide 6 from a third end 17 of the first part 14 towards a fourth end 19 of the first part 14. The pattern is distributed such that for a third area 29 of the touch-surface 20, which third area 29 has an outline that is identical with the outline of the first area 26, and which third area 29 is displaced along the intended direction of the second light 11 from the third end 17 to the fourth end 19, an object (not illustrated that only contacts the entire first area 26 will cause a different disturbance of second light 11 than an object that only contacts the entire third area 29 when second light 11 is guided by the waveguide 6 from the third end 17 towards the fourth end 19.

Figure 9:
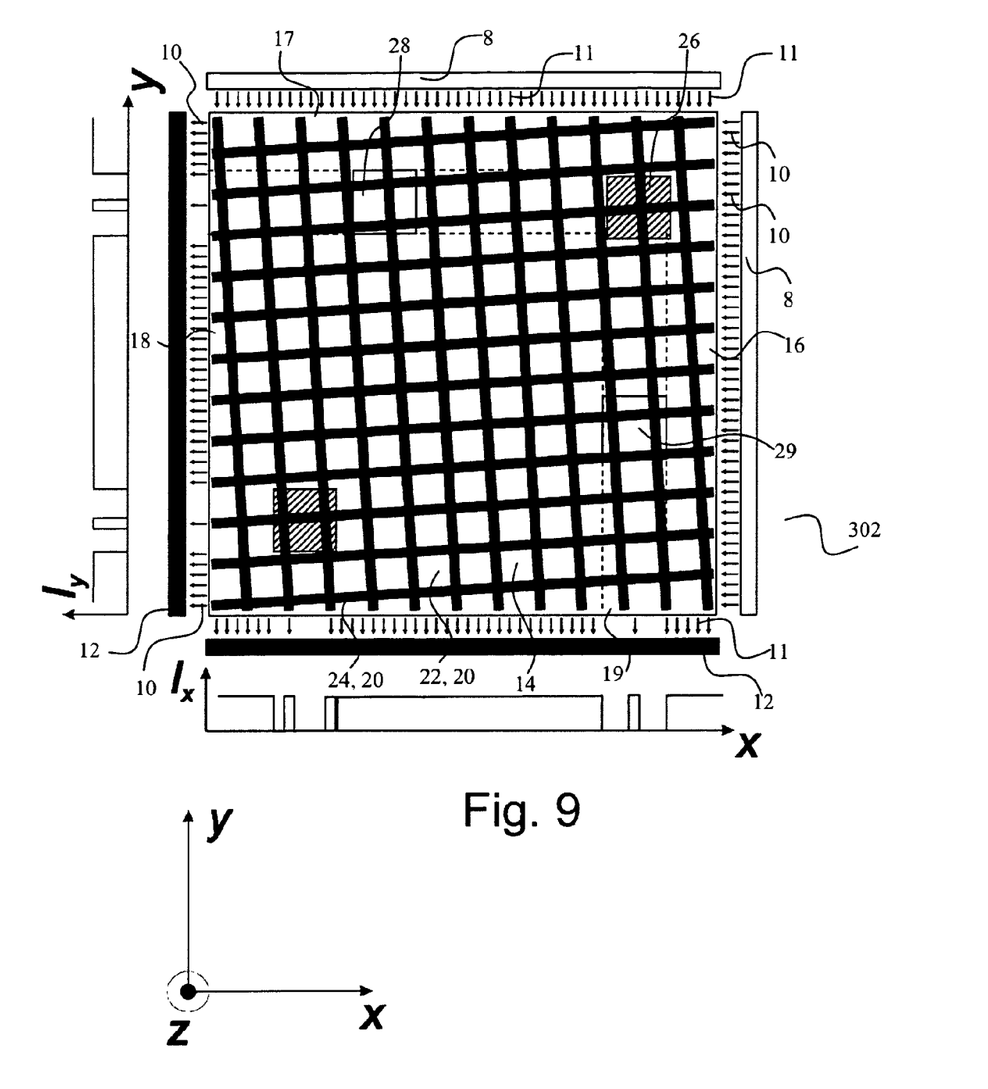

FIG. 9 schematically illustrates a top view of a fourth embodiment 302 of the invention. The device 302 illustrated in FIG. 9 comprises a waveguide 6 (a planar waveguide), at least one light source 8 for emitting first light 10, and at least one detector device 12 for detecting first light 10. The waveguide 6 is adapted to guide first light 10 across at least a first part 14 of the waveguide 6 from a first end 16 of the first part 14 towards a second end 18 of the first part 14. The waveguide 6 has a touch-surface 20 with a surface structure defining a pattern that defines active surface areas 22 and passive surface areas 24. The pattern is distributed such that for a first area 26 of the touch-surface 20 and a second area 28 of the touch-surface 20, which second area 28 has an outline that is identical with the outline of the first area, and which second area 28 is displaced along the direction of the first light 10 from the first end 16 to the second end 18, an object (not illustrated) that only contacts the entire first area 26 will cause a different disturbance of first light 10 than an object that only contacts the entire second area 28 when first light 10 is guided by the waveguide 6 from the first 16 end towards the second end 18. The passive surface areas 24 are provided by coating having a lower refractive index than the waveguide 6. The waveguide 6 is further adapted to guide second light 11 across at least the first part 14 of the waveguide 6 from a third end 17 of the first part 14 towards a fourth end 19 of the first part 14. The pattern is distributed such that for a third area 29 of the touch-surface 20, which third area 29 has an outline that is identical with the outline of the first area 26, and which third area 29 is displaced along the intended direction of the second light 11 from the third end 17 to the fourth end 19, an object (not illustrated that only contacts the entire first area 26 will cause a different disturbance of second light 11 than an object that only contacts the entire third area 29 when second light 11 is guided by the waveguide 6 from the third end 17 towards the fourth end 19. If a touch area, e.g. 26, is significant large in relation to the width of active surface areas 22 and passive surface areas 24, a unique disturbance of first 10 light and/or second light 11 may occur for any touch-position on the touch-surface 20.

Figure 10:
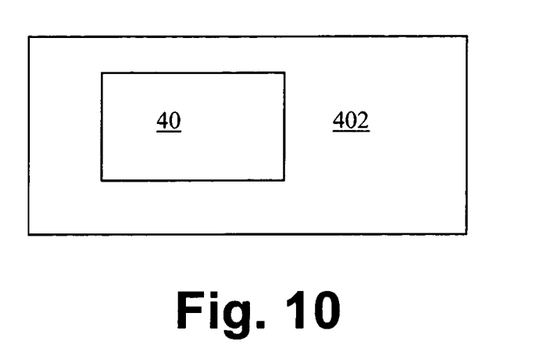

FIG. 10 schematically illustrates a fifth embodiment 402 of a device according to the present invention comprising a processor 40 adapted for position encoding a position of touch based on light intensities received by the at least one detector device. The processor 40 may furthermore be adapted for position encoding a plurality, e.g. two, of concurrent positions of touch based on light intensities received by the at least one detector device.

Figure 11:
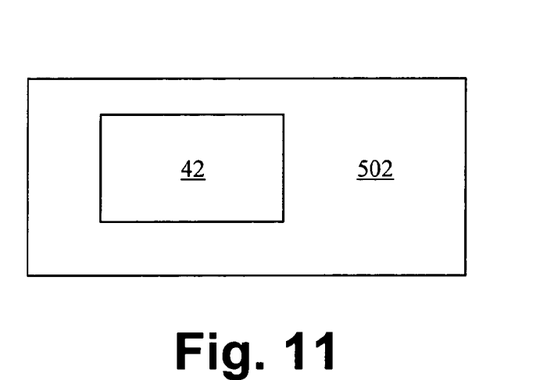

FIG. 11 schematically illustrates a sixth embodiment 502 of a device according to present invention integrated with a touch screen 42, such as incorporated in an optical table or a handheld device such as a handheld device comprising at least one of a mobile phone, a pda, and a portable music player.

Figure 12:
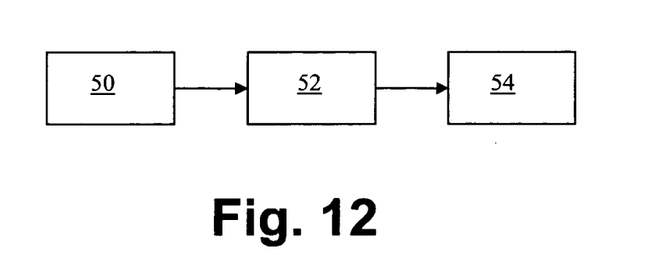

FIG. 12 schematically illustrates a method for detecting at least one position of touch at a touch-surface on a device according to the present invention. The method comprises emitting 50 light into the waveguide, guiding 52 first light within the waveguide from the first end towards the second end, and detecting 54 light arriving at the at least one detector device.

Any combination of the disclosed embodiments is possible. For instance, the embodiment of FIG. 2 and/or FIG. 6 may be provided with both first light and second light as illustrated in FIGS. 8 and 9.

The invention claimed is:

1. A device comprising a waveguide, at least one light source for emitting first light, and at least one detector device for detecting first light, the waveguide being adapted to guide first light across at least a first part of the waveguide from a first end of the first part towards a second end of the first part, the waveguide having a touch-surface with a physical surface structure within the touch-surface and/or on the touch surface defining a pattern that defines active surface areas and passive surface areas, the physical surface structure being distributed such that for a first area of the touch-surface and a second area of the touch-surface, which second area has an outline that is identical with the outline of the first area, and which second area is displaced along the direction of the first light from the first end to the second end, the physical surface structure distributed within the first area distributed differently from the physical structure distributed within the second area, such that an object that only contacts the entire first area will cause a different disturbance of first light than an object that only contacts the entire second area when first light is guided by the waveguide from the first end towards the second end.

2. A device according to claim 1, wherein the waveguide is further adapted to guide second light across at least the first part of the waveguide from a third end of the first part towards a fourth end of the first part, the pattern being distributed such that for a third area of the touch-surface, which third area has an outline that is identical with the outline of the first area, and which third area is displaced along the intended direction of the second light from the third end to the fourth end, an object that only contacts the entire first area will cause a different disturbance of second light than an object that only contacts the entire third area when second light is guided by the waveguide from the third end towards the fourth end.

3. A device according to claim 2, comprising a processor adapted for position encoding a position of an object touching the touch-surface based on light intensities received by the at least one detector device wherein the processor is adapted for position encoding two concurrent positions of objects touching the touchsurface based on light intensities received by the at least one detector device.

4. A device according to claim 1, wherein the waveguide is a planar waveguide.

5. A device according to claim 1, wherein the waveguide comprises a plurality of one-dimensional waveguides, each of which stretching between the first end and the second end.

6. A device according to claim 1, wherein the passive surface areas are provided by coating having a lower refractive index than the waveguide.

7. A device according to claim 1, wherein the passive surface areas are provided by recesses in the touch-surface.

8. A device according to claim 1, wherein the pattern defines a plurality of zones, such that passive surface area parts within each zone are formed by displacement of passive surface area parts within an adjacent zone, the displacement being along two perpendicular directions in relation to the adjacent zone.

9. A device according to claim 1, comprising a processor adapted for position encoding a position of an object touching the touch-surface based on light intensities received by the at least one detector device.

10. A device according to claim 1, wherein the device is integrated with a touch screen, e.g. incorporated in an optical table or a handheld device comprising at least one of a mobile phone, a pda, and a portable music player.

11. A method for detecting at least one position of touch on a touch-surface of a device comprising a waveguide adapted to guide first light across at least a first part of the waveguide from a first end of the first part towards a second end of the first part, the waveguide having the touch-surface with a physical surface structure within the touch-surface and/or on the touch surface defining a pattern that defines active surface areas and passive surface areas, the physical surface structure distributed such that, for a first area of the touch surface and a second area of the touch surface, which second area has an outline that is identical with an outline of the first area, and which second area is displaced along the direction of the first light from the first end to the second end, the physical surface structure distributed within the first area distributed differently from the physical structure distributed within the second area, such that an object that only contacts the entire first area will cause a different disturbance of first light than an object that only contacts the entire second area when first light is guided by the waveguide from the first end towards the second end, the device further comprising at least one light source for emitting first light into the waveguide, and at least one detector device for detecting first light having propagated within the waveguide, the method comprising:
  generating first light by means of the at least one light source,
  guiding first light within the waveguide having the touch-surface with a physical surface structure from the first end towards the second end, and
  detecting, by means of the at least one detector device, light intensities of first light having propagated within the waveguide.

* * * * *